US010078473B2

(12) United States Patent
Ahmed et al.

(10) Patent No.: US 10,078,473 B2
(45) Date of Patent: Sep. 18, 2018

(54) RESOURCE ALLOCATION IN NETWORKED STORAGE SYSTEMS

(71) Applicant: NETAPP, INC., Sunnyvale, CA (US)

(72) Inventors: Reyaz Ahmed, Fremont, CA (US); Mayank Saxena, Pleasanton, CA (US); Todd Jason Mills, Union City, CA (US); Aleksandr Khasymski, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 260 days.

(21) Appl. No.: 15/057,952

(22) Filed: Mar. 1, 2016

(65) Prior Publication Data

US 2016/0283135 A1    Sep. 29, 2016

Related U.S. Application Data

(60) Provisional application No. 62/136,975, filed on Mar. 23, 2015.

(51) Int. Cl.
*G06F 15/16* (2006.01)
*G06F 3/06* (2006.01)
*H04L 29/08* (2006.01)

(52) U.S. Cl.
CPC .............. *G06F 3/067* (2013.01); *G06F 3/061* (2013.01); *G06F 3/0659* (2013.01); *H04L 29/08072* (2013.01)

(58) Field of Classification Search
CPC ............... H04L 29/06; H04L 29/08072; H04L 41/0893

USPC ......... 709/203, 220, 224, 232, 238; 370/230
See application file for complete search history.

(56) References Cited

U.S. PATENT DOCUMENTS

| | | | | |
|---|---|---|---|---|
| 8,145,967 | B2* | 3/2012 | Srinivasan | G06F 11/277 703/1 |
| 9,392,462 | B2* | 7/2016 | Raleigh | H04W 12/08 |
| 9,524,578 | B2* | 12/2016 | Fuchikami | G06T 15/20 |
| 9,749,898 | B2* | 8/2017 | Raleigh | H04L 41/0893 |
| 9,749,899 | B2* | 8/2017 | Raleigh | H04L 41/0893 |
| 9,800,503 | B2* | 10/2017 | Janakiraman | H04L 47/122 |
| 2002/0087709 | A1* | 7/2002 | Kerr | H04L 29/06 709/231 |
| 2009/0100296 | A1* | 4/2009 | Srinivasan | H04L 43/50 714/43 |
| 2010/0054268 | A1* | 3/2010 | Divivier | H04L 49/90 370/412 |

(Continued)

*Primary Examiner* — Khanh Dinh
(74) *Attorney, Agent, or Firm* — Klein, O'Neill & Singh, LLP (57) ABSTRACT

Methods and systems for a storage environment are provided. A policy for an input/output (I/O) stream having a plurality of I/O requests for accessing storage at a storage device of the storage sub-system is translated into flow attributes so that the I/O stream can be assigned to one of a plurality of queues maintained for placing I/O requests based on varying priorities defined by set polices. When an I/O request for the associated policy is received by the storage sub-system; the storage sub-system determines a flow attribute associated with the I/O request and the policy; selects a queue for staging the I/O request, such that the selected queue is of either higher priority than what is indicated by the flow attribute or at least of a same priority as indicated by the flow attribute; and allocates storage sub-system resource for processing the received I/O request.

20 Claims, 9 Drawing Sheets

(56) References Cited

U.S. PATENT DOCUMENTS

| | | | | |
|---|---|---|---|---|
| 2010/0166153 A1* | 7/2010 | Guleria | ............... | H04W 76/007 379/45 |
| 2014/0278641 A1* | 9/2014 | Kleehammer | ... | G06Q 10/06311 705/7.15 |
| 2015/0178657 A1* | 6/2015 | Kleehammer | ... | G06Q 10/06311 705/7.15 |
| 2015/0223071 A1* | 8/2015 | Raleigh | ............... | H04L 41/0893 726/1 |

* cited by examiner

RESOURCE ALLOCATION IN NETWORKED STORAGE SYSTEMS

CROSS-REFERENCE TO RELATED APPLICATIONS

This patent application claims priority under 35 USC 119(e), based on the provisional patent application, Ser. No. 62/136,975 filed on Mar. 23, 2015, entitled "Shared Storage Group Architecture and Associated Methods Thereof" the disclosure of which is incorporated herein in its entirety.

TECHNICAL FIELD

The present disclosure relates to networked storage environments and more particularly, to managing input/output (I/O) requests for accessing storage.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices of a storage sub-system. Typically, a storage sub-system receives various workloads (i.e. requests) that compete for processing resources of the storage sub-system. The attributes of the various workloads vary, for example, some maybe of high importance and others of low importance. Conventional storage sub-systems are not able to efficiently manage I/Os (i.e. requests for reading or writing data) based on I/O attributes because they are often unaware of the attributes or any change in the attributes. Continuous efforts are being made to better manage data flow through storage sub-systems.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, methods and systems for a storage environment are provided. A policy for an input/output (I/O) stream having a plurality of I/O requests for accessing storage at a storage device of a storage sub-system is translated into flow attributes so that the I/O stream can be assigned to one of a plurality of queues maintained for placing I/O requests based on varying priorities defined by associated polices. When an I/O request for an associated policy is received by the storage sub-system; the storage sub-system determines a flow attribute associated with the I/O request and the policy; selects a queue for staging the I/O request, such that the selected queue is of either higher priority than what is indicated by the flow attribute or at least of a same priority as indicated by the flow attribute; and allocates optimum storage sub-system resources for processing the received I/O request.

Figure 1A:
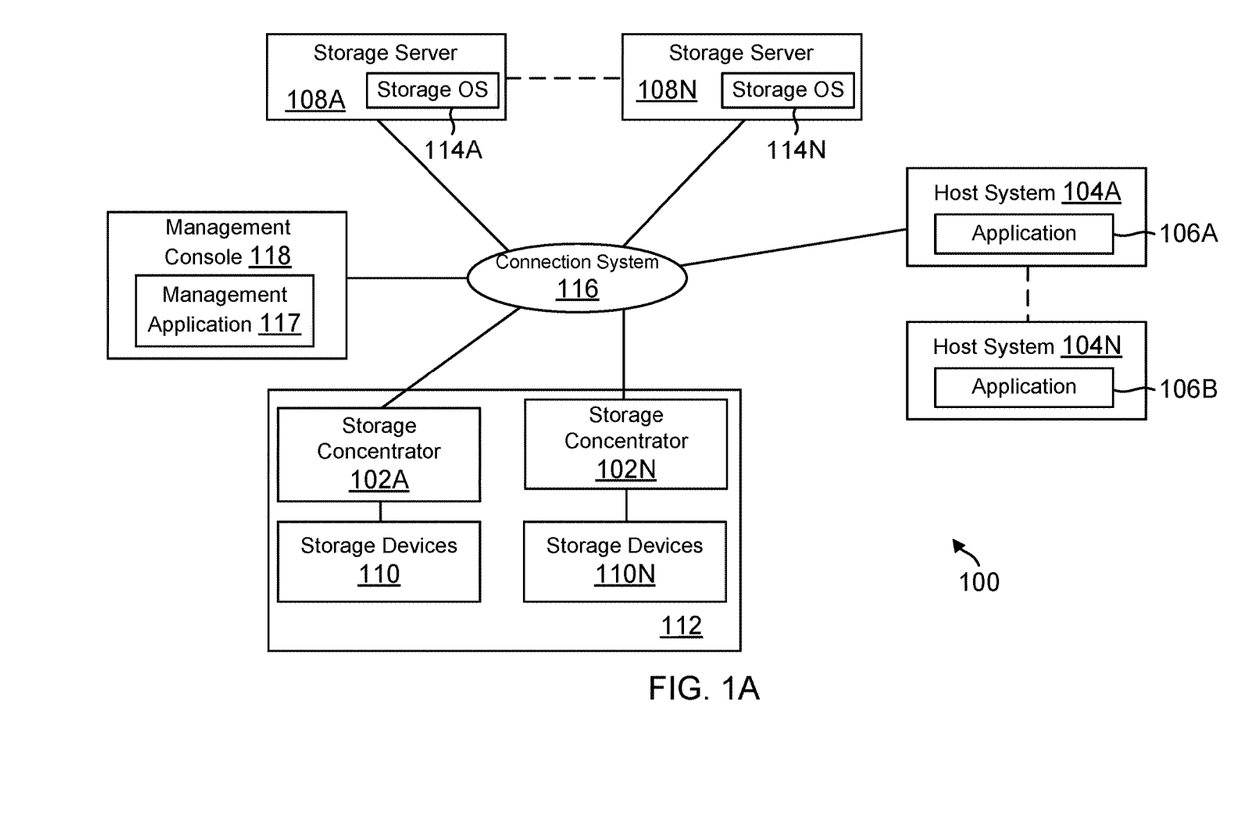
FIG. 1A shows an example of an operating environment for the various aspects disclosed herein.

System 100: FIG. 1A shows an example of a networked operating environment 100 (also referred to as system 100) used according to one aspect of the present disclosure. As an example, system 100 may include a plurality of computing systems 104A-104N (may also be referred to and shown as server system 104 or as host system 104) that may access storage space provided by a storage-subsystem 112 via a connection system (may also be referred to as a fabric) 116 such as a local area network (LAN), wide area network (WAN), the Internet and others. The server systems may be referred to as initiators. The storage-subsystem includes a plurality of storage concentrators 102A-102N (may be referred to as storage concentrator/storage concentrators 102) that manage storage space at storage devices 110A-110N (referred to as storage device/storage devices 102) described below in detail. The storage sub-system or a portion thereof may be uniquely identified and referred to as a target system. The server systems 104 may communicate with each other via connection system 116 (may also be referred to as a fabric), for example, for working collectively to provide data-access service to user consoles (not shown).

Server systems 104 may be computing devices configured to execute applications 106A-106N (may be referred to as application or applications 106) over a variety of operating systems, including the UNIX® and Microsoft Windows® operating systems. Applications 106A-106N (referred to as application 106) may utilize storage devices 110 to storage and access data. Application 106 may include an email exchange application, a database application or any other type of application. In another aspect, application 106 may comprise a virtual machine.

Server systems 104 generally utilize file-based access protocols when accessing information (in the form of files and directories) over a network attached storage (NAS)-based network. Alternatively, server systems 104 may use block-based access protocols, for example but not limited to, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment, according to one aspect. In the virtual machine environment a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one aspect, system 100 includes a plurality of storage servers 108A-108N (may be referred to as storage server or storage servers 108) that each executes a storage operating system 114A-114N (referred to as storage operating system 114). The storage server 108 access the mass storage devices 110 within the storage subsystem 112 via storage concentrators 102. The storage server 108 or an adapter used by the storage server 108 may also be referred to as initiators that initiate I/O requests for reading or writing data using the storage sub-system 102.

The storage devices 110 may include writable storage device media such as magnetic disks, video tape, optical, DVD, magnetic tape, non-volatile memory devices for example, self-encrypting drives, flash memory devices, solid state storage devices (SSDs) and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, the storage operating system 114 "virtualizes" the storage space provided by storage devices 110. The storage server 108 can present or export data stored at storage devices 110 to server systems 104 as a storage volume or one or more qtree sub-volume units. Each storage volume may be configured to store data files (or data containers or data objects), scripts, word processing documents, executable programs, and any other type of structured or unstructured data. From the perspective of the server systems, each volume can appear to be a single drive. However, each volume can represent the storage space in one storage device, an aggregate of some or all of the storage space in multiple storage devices, a RAID group, or any other suitable set of storage space.

It is noteworthy that the term "disk" as used herein is intended to mean any storage device/space and not to limit the adaptive aspects to any particular type of storage device, for example, hard disks.

The storage server 108 may be used to access information to and from storage devices 112 based on a request generated by server system 104, a management console (or system) 118 or any other entity. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 transmits one or more input/output (I/O) commands, such as an NFS or CIFS request, over connection system 116 to the storage server 108. Storage server 108 receives the request, issues one or more I/O commands to the storage sub-system 112 to read or write the data on behalf of the server system 104, and issues an NFS or CIFS response containing the requested data over the connection system 116 to the respective server system 104.

In one aspect, storage server 108 may have a distributed architecture, for example, a cluster based system that may include a separate network module and storage module. Briefly, the network module is used to communicate with host platform server system 104 and management console 118, while the storage module is used to communicate with the storage subsystem 112 (i.e. storage concentrators 102).

The management console 118 is used for managing and configuring various elements of system 100, including the storage concentrators 102. Management console 118 may include one or more computing systems for performing various tasks described below in detail.

Figure 1B:
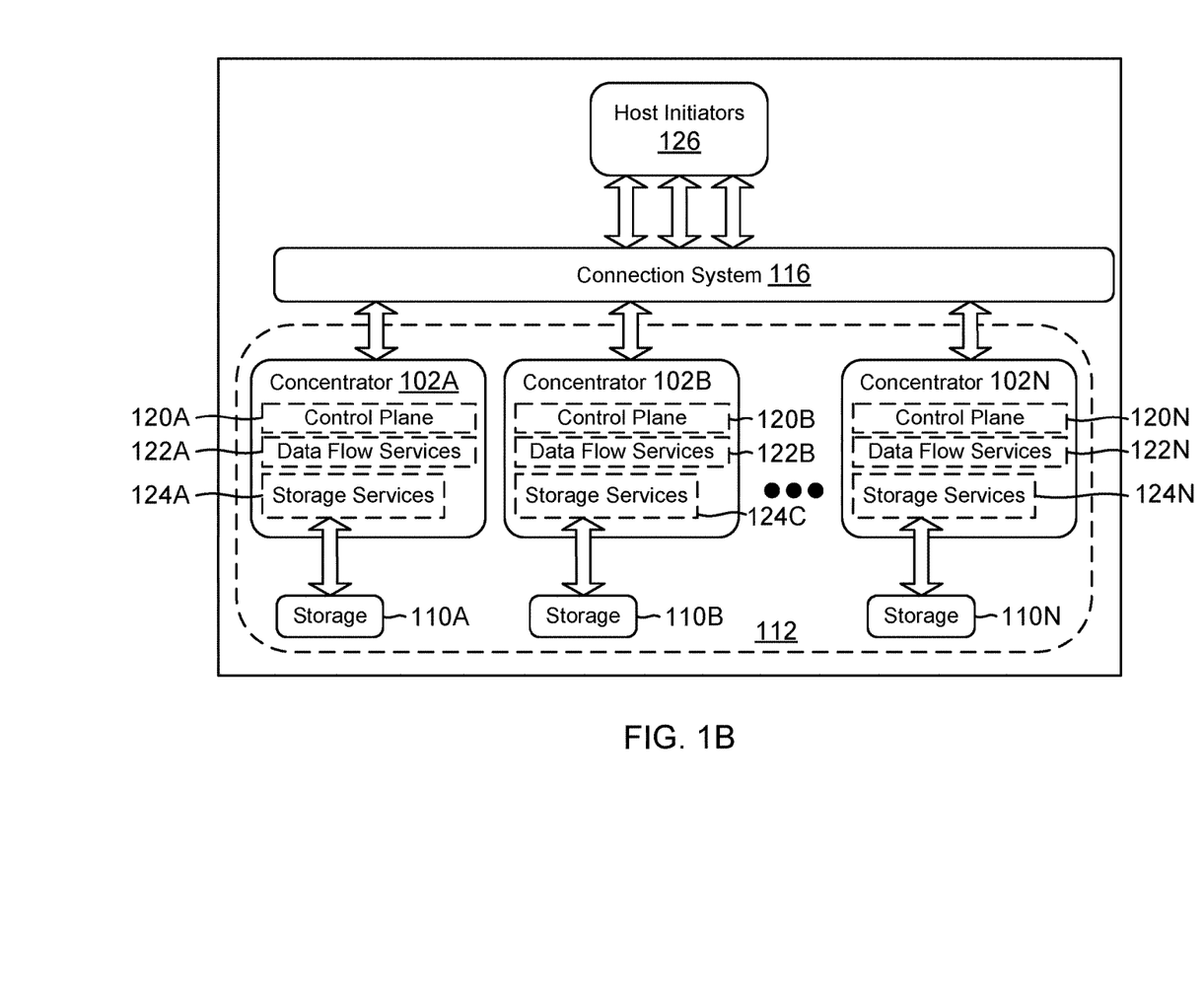
FIG. 1B shows an example of an environment where a plurality of storage sub-systems interface with a plurality of initiators, according to one aspect of the present disclosure.

FIG. 1B shows an example of a plurality of initiators 126 that may generate I/O requests for either storing data or accessing data stored at storage devices 110 via storage concentrators 102. The term initiator as mentioned above may include a storage server 108 (an adapter of the storage server that transmits the I/O requests), the host systems 104 or any other entity that in general communicates with the storage subsystem 112 for accessing storage.

In a conventional environment, a storage subsystem/storage concentrator is typically unaware of the workload attributes for I/O requests from various initiators. The blend of I/O requests from various initiators impact the overall utilization of resources of the storage concentrators 102, for example, the processing unit of the concentrators (CPU), memory and other devices that are used by the storage concentrator for interfacing with the storage devices and the storage servers. The adaptive aspects of the present disclosure alleviate these conventional challenges, as described below in detail.

In one aspect, each storage concentrator implements a control plane 120 (shown as 120A-120N), a data flow services module 122 (shown as 122A-122N) and a storage services module 124 (shown as 124A-124N) that are described below in detail. The control plane 120 is designed to manage and enforce control commands and requests. The data flow services module 122 monitors I/O streams based on polices defined by the management application 117 (also referred to as a central control plane) and assists in allocating appropriate resources for processing I/Os based on defined policies, as described below in detail. The storage service layer 124 executes instructions for interfacing with the actual storage devices 110. Before describing the details of the data flow services module 122, the following describes the overall logical architecture used adaptively by the system 100, according to one aspect of the present disclosure.

Figure 1C:
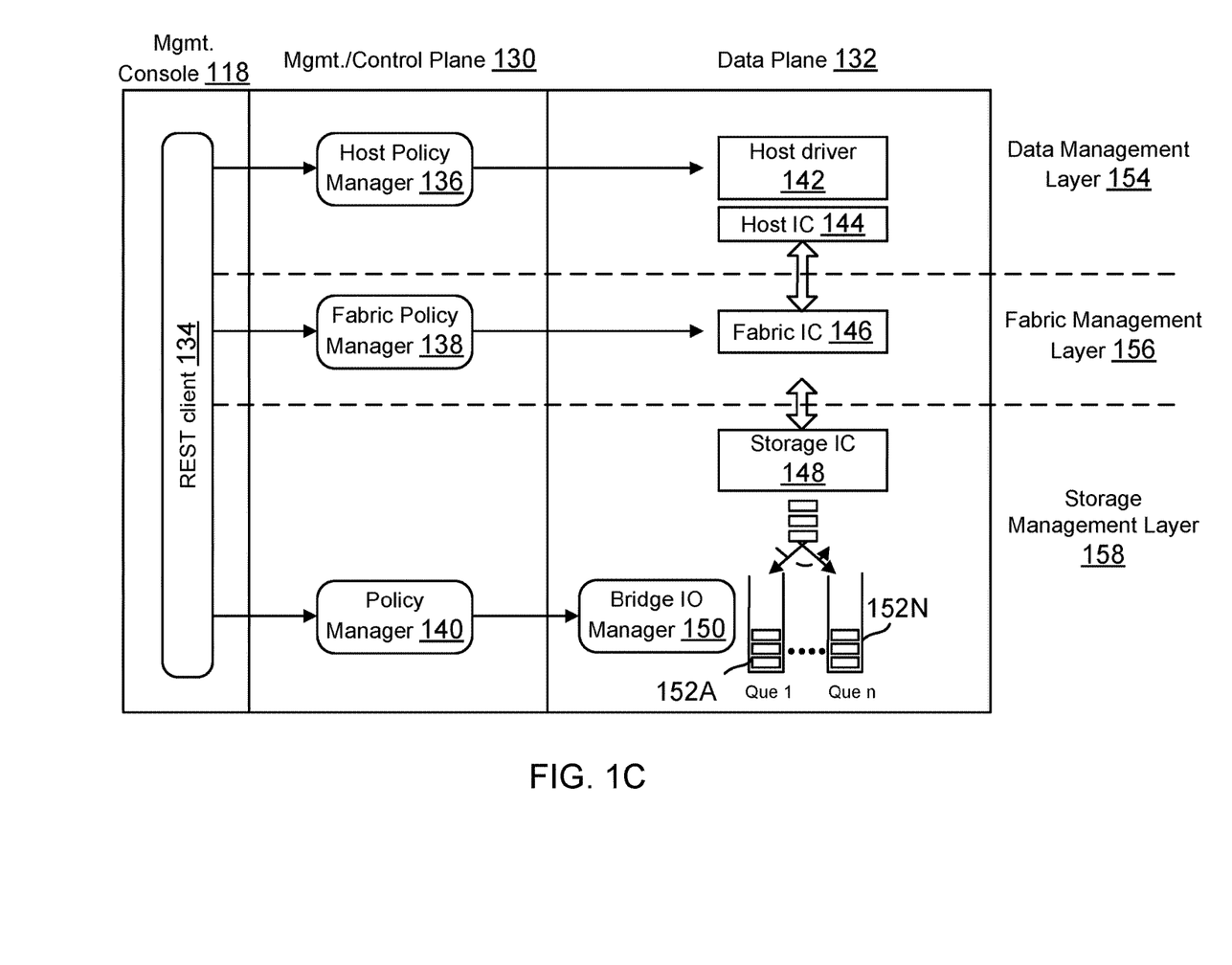
FIG. 1C shows an example of a plurality of layers that are used for prioritizing and managing I/Os, according to one aspect of the present disclosure.

FIG. 1C shows an example of a layered structure used according to one aspect of the present disclosure with respect to the various components of system 100. The structure includes a data management layer 154, a fabric management layer 156 and a storage management layer 158. The data management layer 154 may include various components, for example, the storage operating system 114 executed by a storage server 108 that interacts with the storage sub-system as well as the servers. The fabric management layer 156 may include an interconnect fabric (with one or more network switch, for example, within interconnect 116). The network switch maybe an Ethernet switch or any other switch type. The storage management layer 158 includes various components of the storage concentrators 102 as described below. The interactions between the various layers/components is split between a control plane 130 and a data plane 132 as described in detail below.

In one aspect, the management console 118 may include a REST client 134 that maybe a part of management application 117. REST means "Representational State Transfer". REST is a scalable system used for building web services. REST systems/interface may use HTTP (hyper-text transfer protocol) or other protocols for communicating. The various aspects disclosed herein are not limited to any specific API format.

In one aspect, a host policy manager 136 is a processor executable module, executed by a storage server that may be used to set polices for I/Os. The policies are received from the REST client 134 and provided to the host policy manager 136 and then may be communicated to a host driver 142 executed by the storage server and an interconnect 144 (for example, an adapter) that communicates with the fabric interconnect 146 (for example, a switch). The host driver 142 is used to interface with the fabric interconnect 144 and may be a network interface card (NIC) driver.

The fabric policy manager 138 is also a processor executable module that receives input from the REST client 134 and is used to set fabric polices that are provided to a fabric interconnect 146 (for example, a switch within connection system 116). The control plane 130 also includes a processor executable policy manager 140 executed by a storage concentrator control plane 120. The policy manager 140 translates policies for I/Os into flow attributes. The flow attributes are provided to a processor executable bridge I/O manager 150 executed at the storage sub-system 112. The flow attributes are used to manage I/O flow and execution, as described below in detail. The storage concentrators 102 include a storage interconnect (IC) 148 (for example, an adapter) that receives I/Os from the fabric Interconnect 146. In one aspect, the storage concentrators 102 maintain various priority queues 152A-152N for managing I/Os and allocating resources based on defined policies, as described below in detail.

In one aspect, an I/O stream is associated with a policy. The storage management layer 158 control plane translates the policy into flow attributes, allocates resources and provides a desired QOS (quality of service) to an initiator.

Figure 1D:
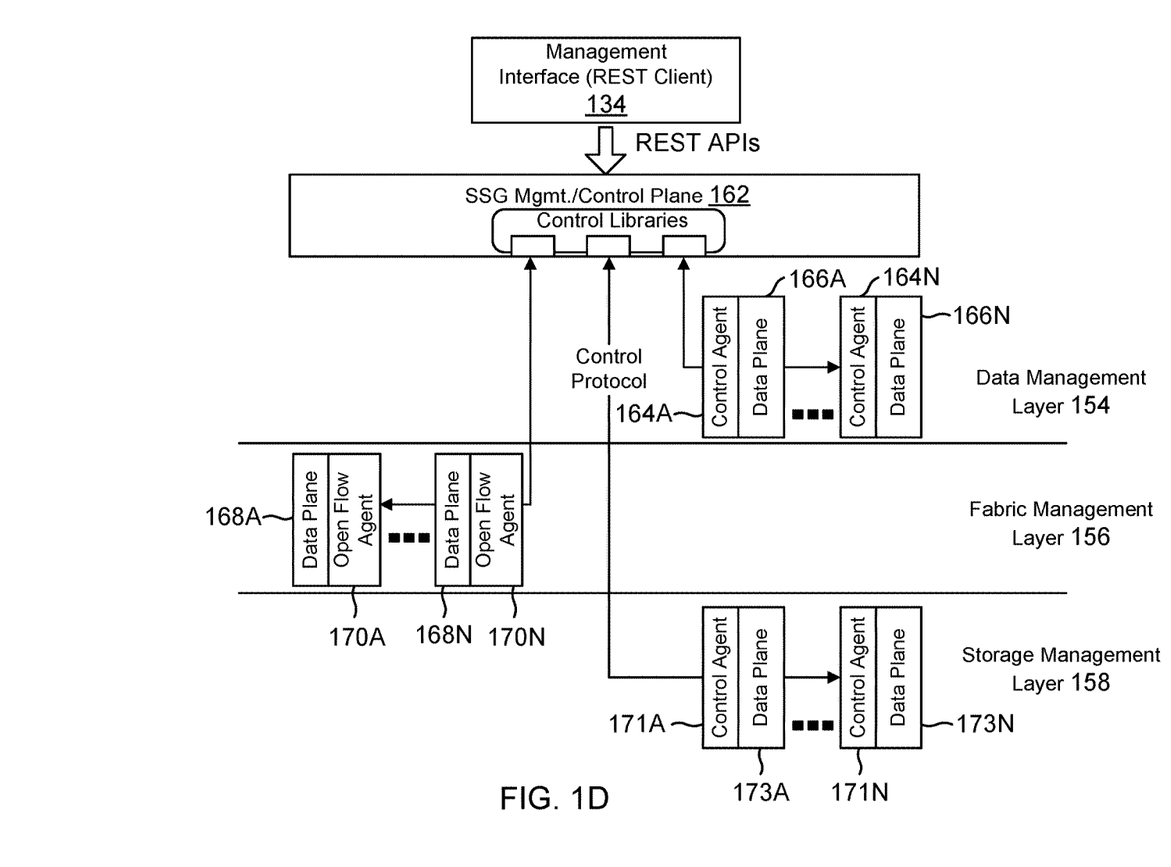
FIG. 1D shows another example of a plurality of layers that are used for prioritizing and managing I/Os, according to one aspect of the present disclosure.

FIG. 1D shows yet another example for implementing the various layers of FIG. 1C. FIG. 1D shows various control agents in different layers, for example, 154, 156 and 158. The REST APIs 134 are provided to the central control plane 162 (implemented at management console 118). The central control plane 162 maintains various control libraries that are used to set I/O policies as well as interface with other control agents. Each server/host executes a control agent 164 (shown as 164A-164N) and a data plane 166 (shown as 166A-166N). The fabric layer 156 includes a data plane 168 (shown as 168A-168N) and agent 170 (shown as Openflow Agent 170A-170N). OpenFlow is an industry standard for software defined network. The various aspects described herein are not limited to any particular industry standard.

In one aspect, the control agents are a conduit to the data plane APIs. The centralized control plane 162 interacts with the control agents that in turn communicate with the data plane components.

As an example, control agent 164 executed at the storage servers/host systems notify the data plane 166 of any events or changes in the fabric. The control agents 164 may also be used to moderate the behavior of the storage servers. The data plane 166 include APIs to control the I/O path by monitoring and measuring I/O traffic, configuring and controlling I/O traffic of the server data plane and assign and enforce policies at VM level in a virtual workload environment.

The fabric control agents 170 monitors the switch fabric 116. In one aspect, control agents 170 are executed on Ethernet switches managed using the OpenFlow protocol. Control agent 170 may be used to setup policy during initialization, perform congestion detection and other switch functions.

The control agents 171 (shown as 171A-171N) are used to translate control polices into storage specific configurations by invoking data plane 173 APIs. The APIs may be used to monitor and measure I/O traffic through the storage management layer 158 data plane as well as configure and control the I/O traffic of the storage data plane layer, as described below in detail.

Figure 1E:
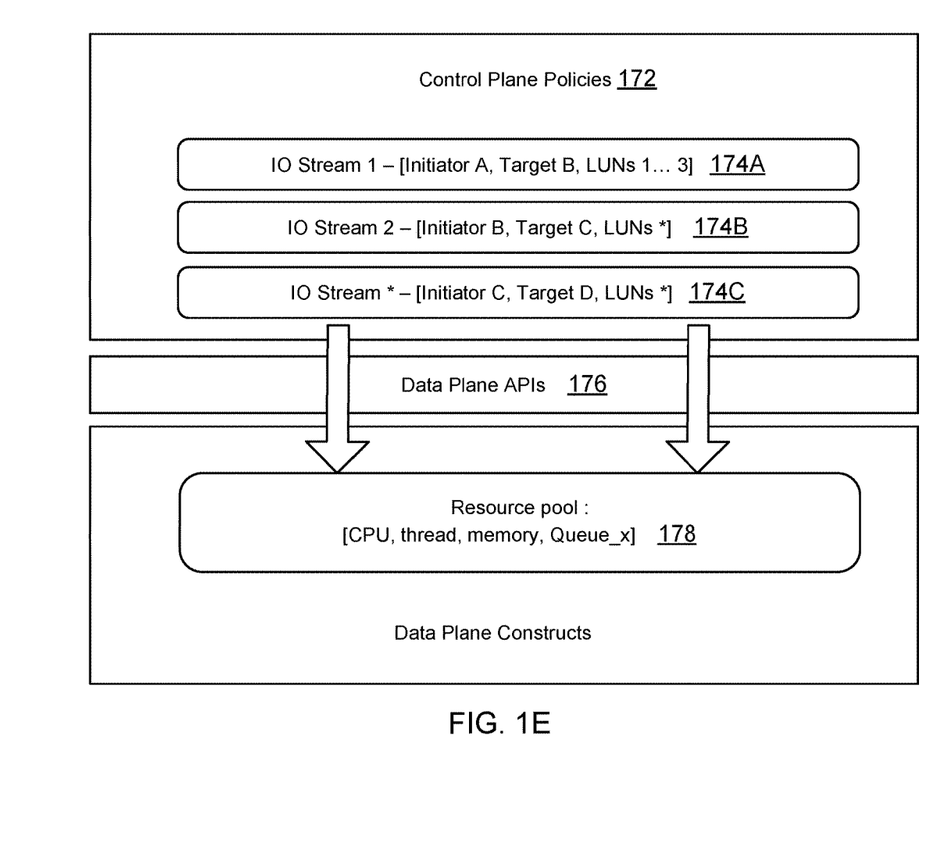
FIG. 1E shows an example of setting up policies for managing I/Os, according to one aspect of the present disclosure.

FIG. 1E shows an example of creating control plane policies 172 using the management console 118, according to one aspect of the present disclosure. The control plane policies include a plurality of policies shown as 174A-174C that are provided to a set of data plane APIs 176 that are then mapped into a resource pool 178 of the storage concentrator 102. The resource pool 178 may include a CPU thread of the storage concentrator, a memory and a priority queue that is described below in detail. The data plane constructs i.e. the resource pool 178 is used to efficiently manage I/O traffic, as described below in detail.

In one aspect, the I/O policies 174A-174C may be generated based on a plurality of factors. In one aspect, the various factors may be defined by a combination of tuples. The tuples define end to end I/O characteristics for one initiator or a set of initiators. The following provide examples of defining I/O polices, according to one aspect of the present disclosure.

[Initiator, Target, LUN set, IO profile]—In one aspect, this provides a format for setting policies for IOs between an Initiator and a target for a set of LUNs. For example, an initiator 'A' accessing target 'B' and a set of LUNs 'Lx' may be represented by the following tuples:

[Initiator A, Target B, LUNs [X,Y, and Z], IO policy]--> {Initiator [A], Target [B], LUNs [x, y, z. . . ], IO profile }.

The IO profile maybe defined with a set of tuples: [IO profile]-->{RD/WR, Min BW, IOPs, Latency per IO, % Variance}, where RD/WR=Read/Write; Min BW means minimum bandwidth, IOPS means number of IO operations per second, latency per IO is a permissible delay for an I/O and % variance defines the variance of these metrics.

Use the foregoing layout, policies can be defined within a name space for targets implementing object storage interface. For example, the following definitions can be used by initiators accessing key/value based object targets:

[Initiator, IO Tag, IO profile]—This defines a general template for IOs from an Initiator with a specific tag.

[Initiator, ObjectContainer, IO profile]—This defines a general template for IOs from an Initiator accessing objects within a container or path.

Figure 1F:
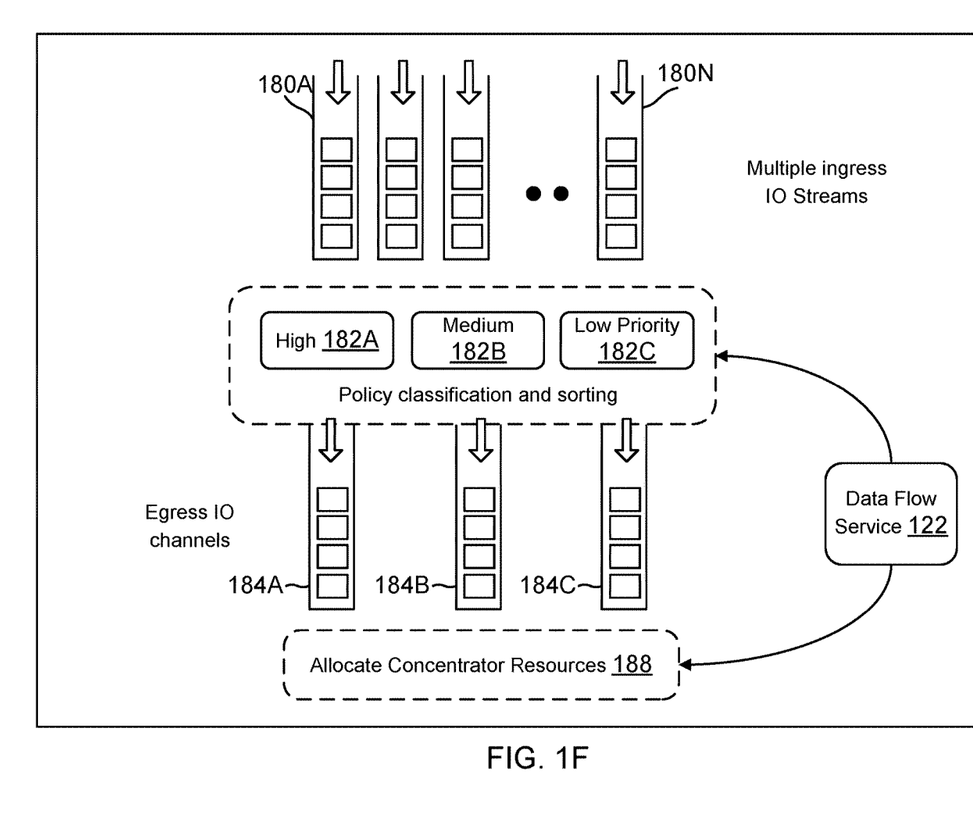
FIG. 1F shows an example of using multiple queues at a storage sub-system, according to one aspect of the present disclosure.

In one aspect, the various I/O streams are treated differently based on associated policies. This is shown in FIG. 1F, where multiple I/O streams 180A-180N are received by a storage concentrator 102. The I/O streams have associated I/O policies (e.g. 174A-174C, FIG. 1E).The I/O streams may be staged in a high priority queue 182A, medium priority queue 182B or low priority queue 182C based on the associated policy. The processor executable, data flow service 122 module selects a particular channel for an I/O processor of a storage concentrator. The channels are shown as 184A-184C. The I/O processor elements (for example, CPU, memory and other resources) 188 are selected by the data flow service module 122. Details of handling the priority queues are provided below with respect to FIGS. 2A-2B.

Figure 2A:
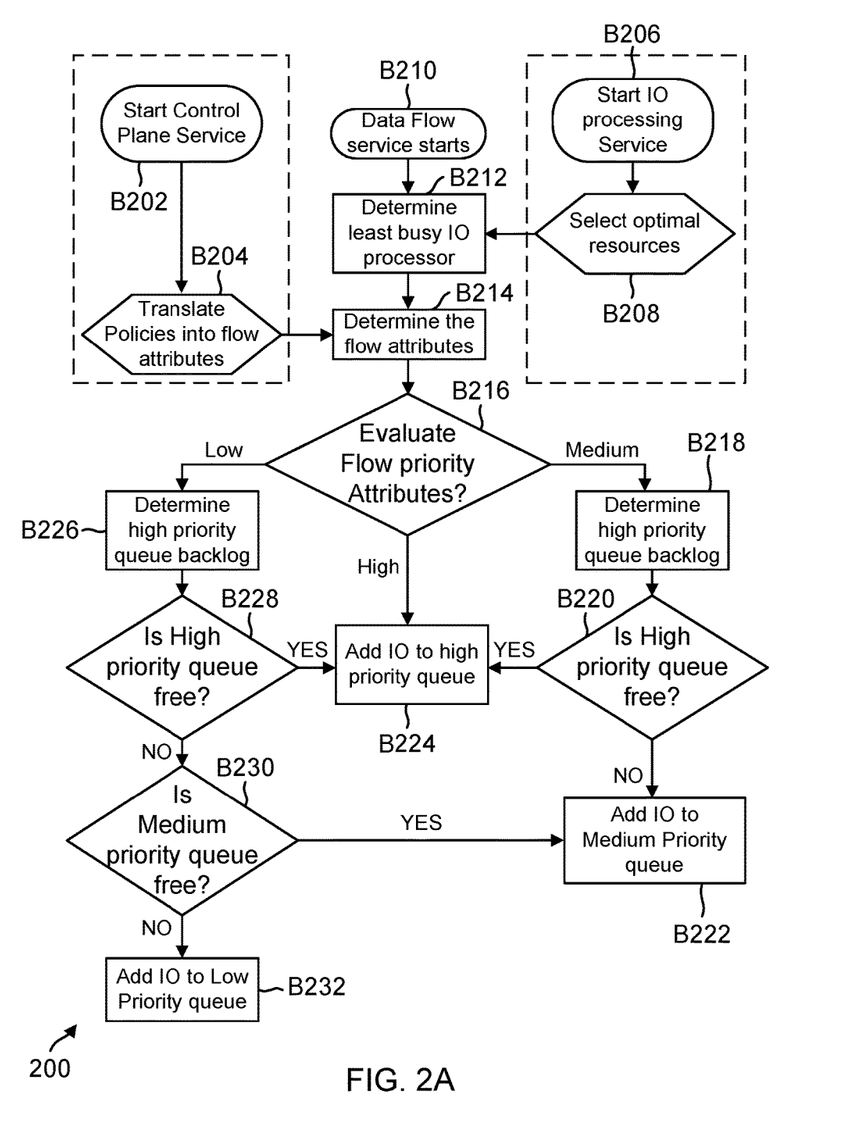
FIGS. 2A-2B show example of process flows, according to one aspect of the present disclosure.

Process Flows: FIG. 2A shows a process 200, according to one aspect of the present disclosure. As part of process 200, a processor executable, control plane service is executed at each concentrator in block B202. This service is a background service that is executed on a regular basis for managing I/O traffic. In one aspect, the management console 118 sends I/O policies (for example, 174A-174C) to the control plane service of the storage concentrator that translates the policies details into flow attributes in block B204. The flow attributes are then used by the storage concentrator to monitor I/O traffic and assign appropriate resources for processing the I/O requests.

In the background, another processor executable service, shown as an I/O processing service starts in block B206. This service is a monitoring service that monitors the various resources of the storage concentrator, for example, CPU utilization, memory usage and any other parameter. The monitored information is stored at a data structure (not shown) at a memory of the storage concentrator. The monitoring service also provides guidance to selects concentrator resources in block B208 for processing I/O requests.

The processor executable, data flow service for processing I/Os starts in block B210 when one or more I/O requests are received from the storage server 108 or any other entity. A least busy processor of a storage concentrator is identified in block B212 based on the input from the monitoring service. The flow attributes are received from the control plane and determined in block B214. The service in block B216 evaluates the flow attributes to determine if an I/O or a group of I/Os are high priority, medium priority or low priority.

The high priority I/Os are added to the high priority queue in block B224. When the I/O is of medium priority, the process determines the backlog of the high priority queue i.e. if there is any room to add more I/Os. In block B220, the process determines if the high priority queue is free. If yes, then the I/O is added to the high priority queue. If not, then the I/O request is added to the medium priority queue in block B222.

If the I/O is low priority, then the process executes blocks B226 and B228 that are similar to blocks B218 and B220, respectively. If a high priority queue is not available, then the medium priority queue is analyzed to determine if the medium priority queue is free. If yes, then the I/O is added to the medium priority queue in block B222. If not, then the process adds the I/O to the low priority queue.

In one aspect, the systems and processes described herein provide a policy driven mechanism to monitor, moderate and expedite flow of information through a complex I/O path. The I/O priority is used to select and deselect I/Os for processing. The processes described herein are able to accommodate different service levels.

Figure 2B:
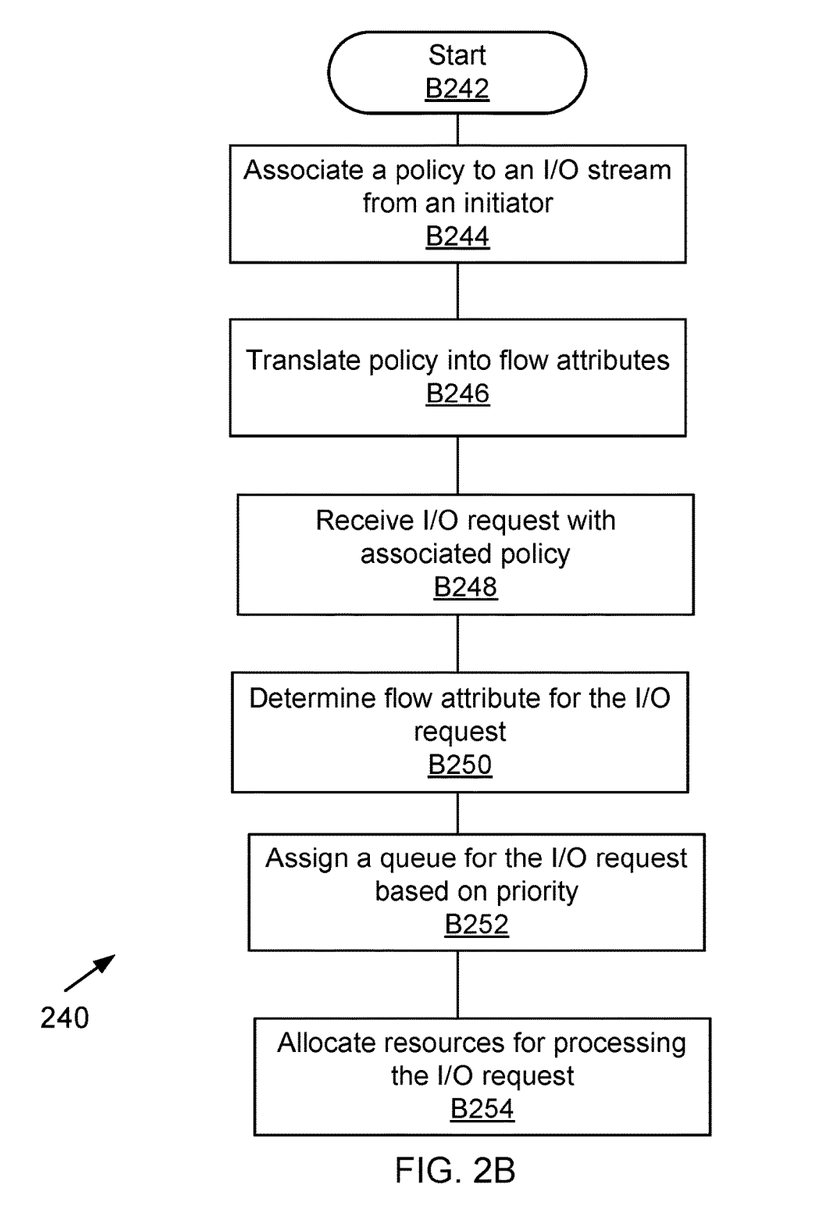

FIG. 2B shows a process 240, according to one aspect of the present disclosure. The process begins in block B242, when management console 118 and REST client 134 are initialized and operational. Using management console 118, a policy is associated for an I/O stream that may be generated by an initiator and have a plurality of I/O requests for accessing storage at a storage device managed by a storage concentrator 102.

In block B246, a control plane service executed a processor of the storage concentrator translates the policy into flow attributes (e.g. latency, priority, and others) so that the I/O stream can be assigned to one of a plurality of queues (182A-182C) maintained by the storage concentrator for placing I/O requests based on varying priorities defined by polices set by the management console 118.

In block B248, an I/O request for the associated policy is received by the storage concentrator that determines a flow attribute associated with the I/O request and the policy. The flow attribute will vary with the set configurable policy.

In block B252, the storage concentrator 102 selects a queue for staging the I/O request and then assigns the queue. The selected queue is of either higher priority than what is indicated by the flow attribute or at least of a same priority as indicated by the flow attribute. In block B254, the storage concentrator allocates resources for processing the received I/O request, based on resource utilization and availability.

Figure 3:
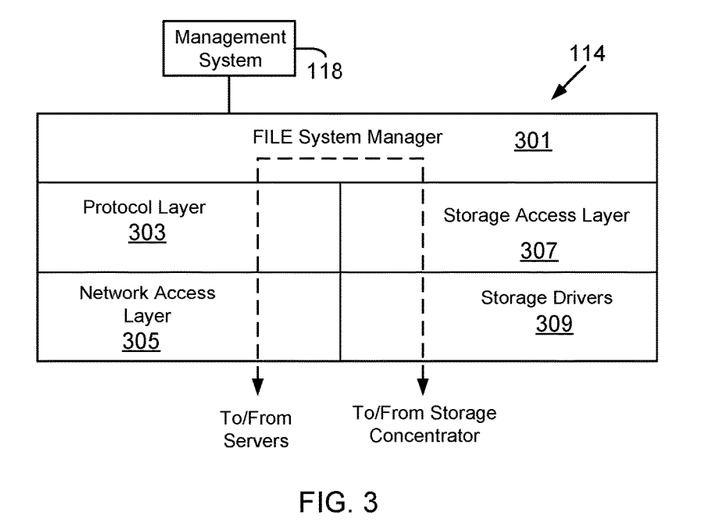
FIG. 3 shows an example of a storage operating system, used according to one aspect of the present disclosure.

Operating System: FIG. 3 illustrates a generic example of operating system 114 executed by storage server 108, according to one aspect of the present disclosure. Storage operating system 114 interfaces with the management console 118 and the storage concentrators 102, described above in detail.

As an example, operating system 114 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 114 may also include a protocol layer 303 and an associated network access layer 305, to allow system 200 to communicate over a network with other systems, such as server system 104, concentrators 102 and management console 118. Protocol layer 303 may implement one or more of various higher-level network protocols, such as NFS, CIFS, Hypertext Transfer Protocol (HTTP), TCP/IP and others.

Network access layer 305 may include one or more drivers, which implement one or more lower-level protocols to communicate over the network, such as Ethernet. Interactions between server systems 104 and mass storage devices 110 are illustrated schematically as a path, which illustrates the flow of data through operating system 114.

The operating system 114 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage server 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
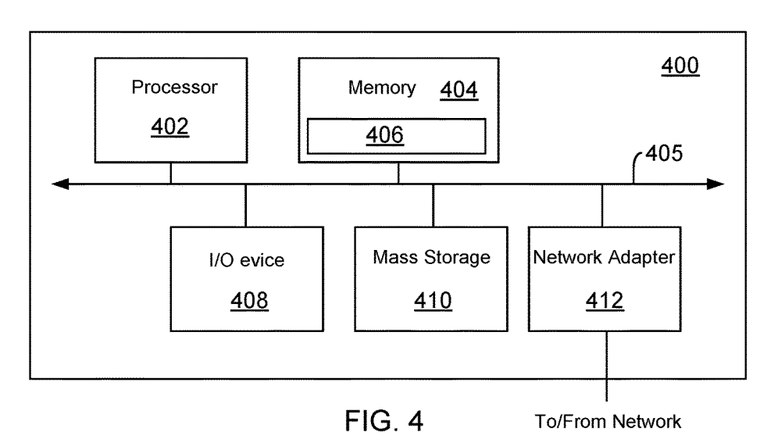
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of the storage concentrator 102, management console 118, server systems 104, storage server 108 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for implementing the control agents, the various data plane APIs as well as instructions for executing the process blocks of FIG. 2A-2B.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management console 118 (and associated methods thereof) and storage systems described above can be a part of the server layer for providing storage services. Details regarding these layers are not germane to the inventive aspects.

Thus, a method and apparatus for managing I/O requests within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising;
associating a policy for an input/output (I/O) stream having a plurality of I/O requests for accessing storage at a storage device of a storage sub-system for reading and writing data;
translating the policy into flow attributes by a processor of the storage sub-system for assigning the I/O stream to one of a plurality of queues maintained by the processor for placing I/O requests based on varying priorities defined by set polices;
determining a flow attribute associated with an I/O request received by the storage sub-system and the policy; and
selecting a queue for staging the I/O request, wherein the selected queue is one of, a higher priority than what is indicated by the flow attribute, and at least of a same priority as indicated by the flow attribute
wherein a storage sub-system resource is allocated for processing the received I/O request;
wherein the policy identifies an initiator that generates the I/O stream, a target that identifies the storage sub-system for processing the I/O stream and a set of values that are based on a set of tuples identifying that the policy is for read requests.

2. The method of claim 1, wherein the set of tuples identify that the policy is for write requests.

3. The method of claim 1, wherein the set of tuples identify a latency for processing the I/O stream and a number of I/O operations that are processed within a duration.

4. The method of claim 1, wherein the set of tuples identify the policy is for read and write requests.

5. The method of claim 1, wherein the set of tuples identify an acceptable variance of parameters defined by the policy.

6. The method of claim 1, wherein the storage sub-system tracks storage-subsystem resource utilization and allocates the resource for the I/O request to meet a certain service level defined by the policy.

7. The method of claim 1, wherein the storage sub-system maintains a high priority queue, a medium priority queue and a low priority queue and when the I/O request is for a medium priority, then the storage-subsystem first attempts to find space at the high priority queue and if high priority queue space is unavailable, then the I/O request is staged at the medium priority queue.

8. A non-transitory, machine-readable storage medium having stored thereon instructions for performing a method, comprising machine executable code which when executed by at least one machine, causes the machine to:
associate a policy for an input/output (I/O) stream having a plurality of I/O requests for accessing storage at a storage device of a storage sub-system for reading and writing data;
translate the policy into flow attributes by a processor of the storage sub-system for assigning the I/O stream to one of a plurality of queues maintained by the processor for placing I/O requests based on varying priorities defined by set polices;
determine a flow attribute associated with an I/O request received by the storage sub-system and the policy; and
select a queue for staging the I/O request, wherein the selected queue is one of, a higher priority than what is indicated by the flow attribute, and at least of a same priority as indicated by the flow attribute
wherein a storage sub-system resource is allocated for processing the received I/O request;
wherein the policy identifies an initiator that generates the I/O stream, a target that identifies the storage sub-system for processing the I/O stream and a set of values that are based on a set of tuples identifying that the policy is for read requests.

9. The non-transitory, storage medium of claim 8, wherein the set of tuples identify that the policy is for write requests.

10. The non-transitory, storage medium of claim 8, wherein the set of tuples identify a latency for processing the I/O stream and a number of I/O operations that are processed within a duration.

11. The non-transitory, storage medium of claim 8, wherein the set of tuples identify the policy is for read and write requests.

12. The non-transitory, storage medium of claim 8, wherein the set of tuples identify an acceptable variance of parameters defined by the policy.

13. The non-transitory, storage medium of claim 8, wherein the storage sub-system tracks storage-subsystem resource utilization and allocates the resource for the I/O request to meet a certain service level defined by the policy.

14. The non-transitory, storage medium of claim 8, wherein the storage sub-system maintains a high priority queue, a medium priority queue and a low priority queue and when the I/O request is for a medium priority, then the storage-subsystem first attempts to find space at the high priority queue and if high priority queue space is unavailable, then the I/O request is staged at the medium priority queue.

15. A system, comprising:
a memory containing machine readable medium comprising machine executable code having stored thereon instructions; and a processor module of a storage sub-system coupled to the memory, the processor module configured to execute the machine executable code to:
translate a policy for an input/output (I/O) stream having a plurality of I/O requests for accessing storage at a storage device of the storage sub-system for reading and writing data, into flow attributes for assigning the I/O stream to one of a plurality of queues maintained for placing I/O requests based on varying priorities defined by polices;

determine a flow attribute associated with an I/O request received by the storage sub-system and the policy; and select a queue for staging the I/O request, wherein the selected queue is one of, a higher priority than what is indicated by the flow attribute, and at least of a same priority as indicated by the flow attribute wherein a storage sub-system resource is allocated for processing the received I/O request;

wherein the policy identifies an initiator that generates the I/O stream, a target that identifies the storage sub-system for processing the I/O stream and a set of values that are based on a set of tuples identifying that the policy is for read requests.

16. The system of claim 15, wherein the set of tuples identify that the policy is for write requests.

17. The system of claim 15, wherein the set of tuples identify a latency for processing the I/O stream and a number of I/O operations that are processed within a duration.

18. The system of claim 15, wherein the set of tuples identify the policy is for read and write requests.

19. The system of claim 15, wherein the set of tuples identify an acceptable variance of parameters defined by the policy.

20. The system of claim 15, wherein the storage sub-system maintains a high priority queue, a medium priority queue and a low priority queue and when the I/O request is for a medium priority, then the storage-subsystem first attempts to find space at the high priority queue and if high priority queue space is unavailable, then the I/O request is staged at the medium priority queue.

* * * * *